US006056283A

United States Patent [19]

Gage et al.

[11] Patent Number: 6,056,283

[45] Date of Patent: May 2, 2000

[54] TACK FASTENER

[75] Inventors: Roger A. Gage, Marysville; Laurence N. Hazlehurst, Seattle; Milton R. Jack, Everett, all of Wash.

[73] Assignee: The Boeing Company, Seattle, Wash.

[21] Appl. No.: 09/246,068

[22] Filed: Feb. 8, 1999

[51] Int. Cl.[7] .......... B23Q 3/00

[52] U.S. Cl. .......... 269/49; 269/48.4

[58] Field of Search .......... 269/49, 48.1, 48.2, 269/48.3, 48.4; 29/263

[56] References Cited

U.S. PATENT DOCUMENTS

| | | | |
|---|---|---|---|
| 2,161,464 | 6/1939 | Gilbert | 269/48.4 |
| 3,000,086 | 9/1961 | Davis | 269/48.4 |
| 3,883,129 | 5/1975 | Jones | 269/49 |
| 4,175,734 | 11/1979 | Williams | 369/49 |
| 4,701,989 | 10/1987 | Cayzer | 369/48.1 |
| 5,067,696 | 11/1991 | Morley | 269/49 |
| 5,240,361 | 8/1993 | Armstrong et al. | 269/48.2 |

FOREIGN PATENT DOCUMENTS

| | | | |
|---|---|---|---|
| 964157 | 2/1946 | France | 269/48.4 |

*Primary Examiner*—David A. Scherbel
*Assistant Examiner*—Daniel G. Shanley
*Attorney, Agent, or Firm*—Brooks Kushman P.C.

[57] ABSTRACT

A tack fastener temporarily holds two or more parts together. An elongate tubular body of the tack fastener includes a longitudinal center cavity formed therein along a longitudinal center axis. A threaded hub is provided at a first end of the body and a plurality of tangs at a second end. Each of the tangs includes an enlarged tip having an inner shoulder that lies orthogonal to the longitudinal center axis. Each of the tangs has an outer surface which tapers inwardly toward the longitudinal axis in a direction toward the tip. A compression nut is mounted on the threaded hub. A stem is slidably mounted in the longitudinal center cavity. The stem includes a cone-shaped spreader with a distal end and having a contact surface with a gradually enlarging diameter in a direction toward the distal end. The spreader is movable between a position out of alignment with and a position in alignment with the enlarged tips. When in the position in alignment with the enlarged tips, the spreader spreads the tips outwardly equidistant from the longitudinal center axis.

20 Claims, 3 Drawing Sheets

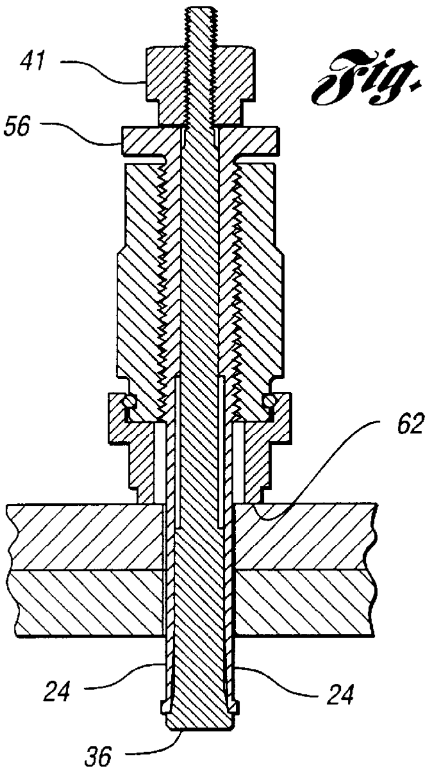
Fig. 3
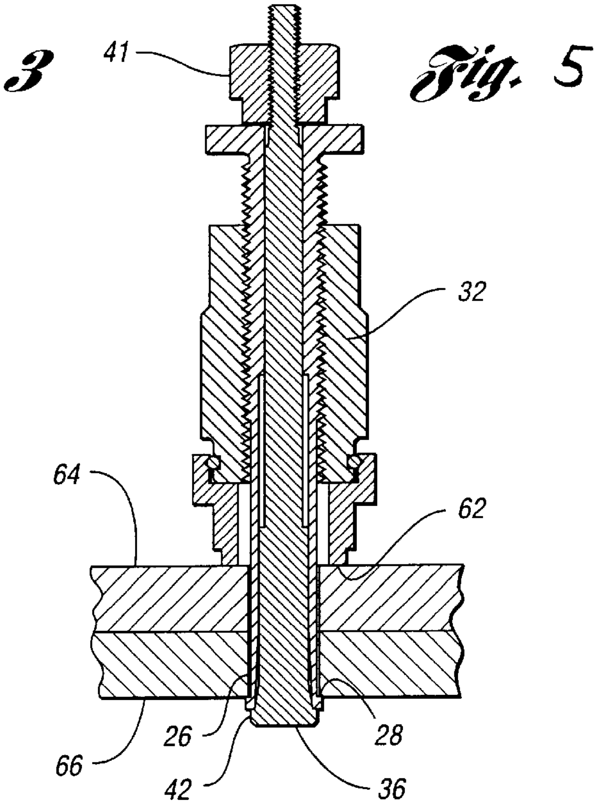
Fig. 5
Fig. 4
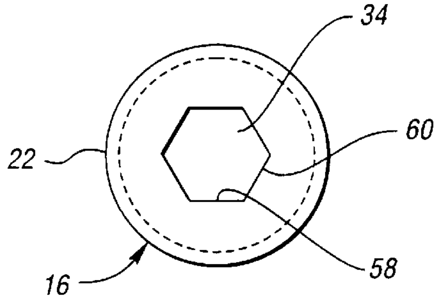
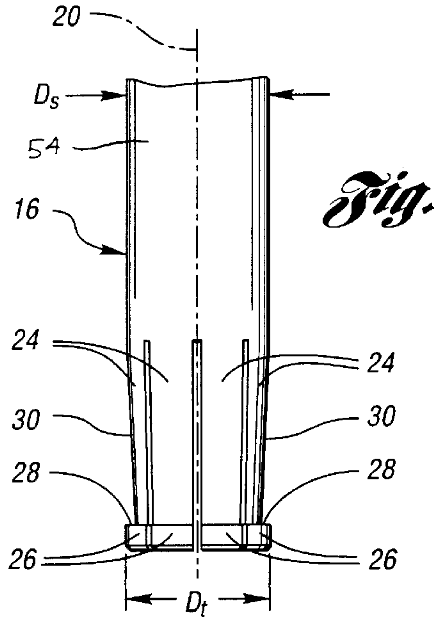
Fig. 6
Fig. 7
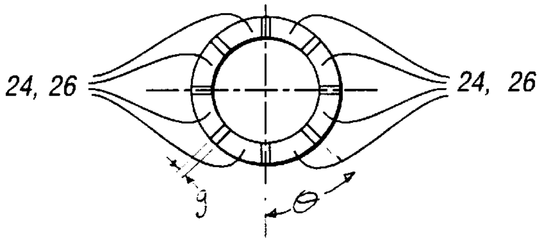

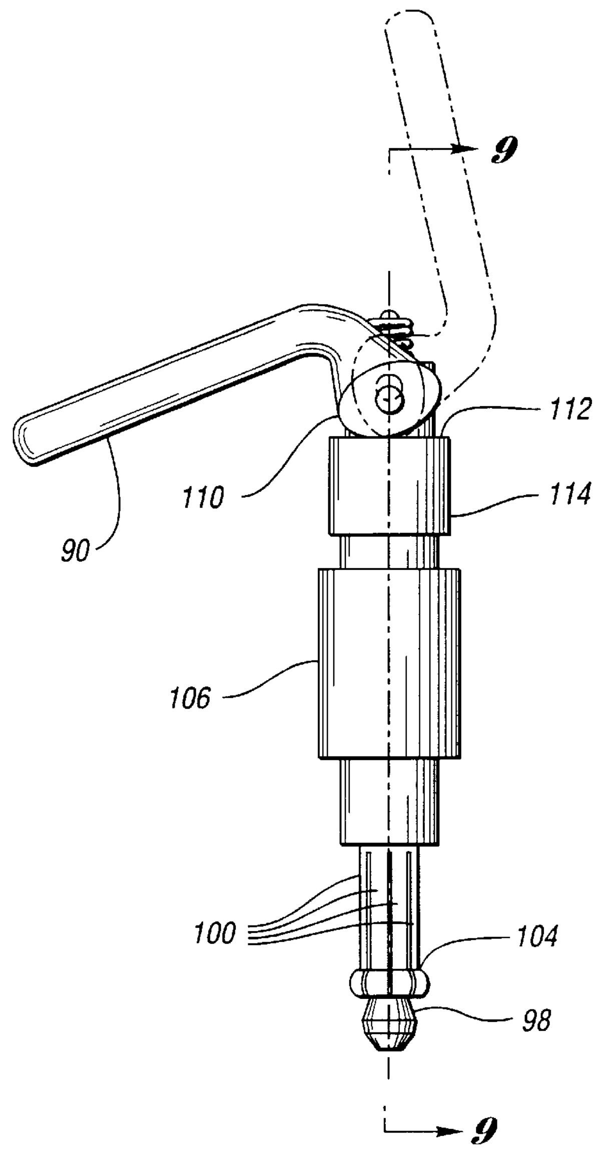
Fig. 8
Fig. 9
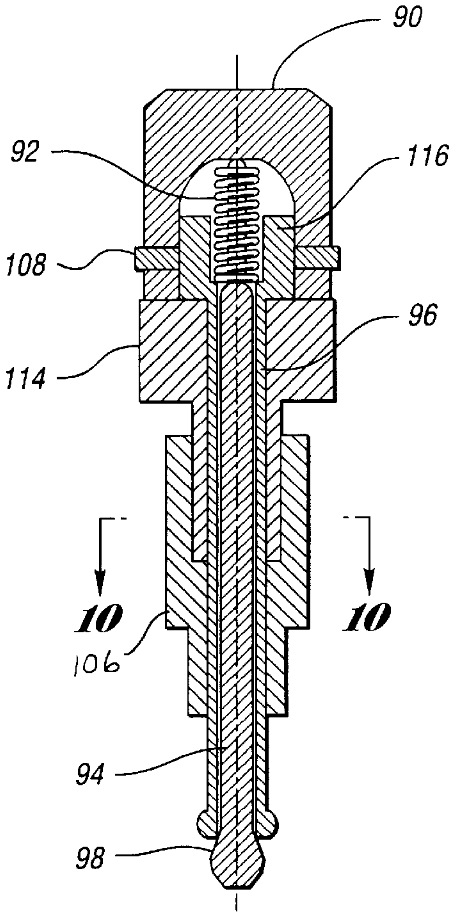
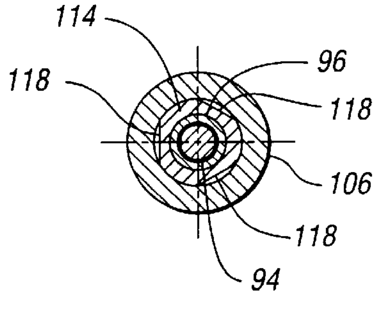
Fig. 10

TACK FASTENER

BACKGROUND OF THE INVENTION

1. Field of the Invention

The invention relates to fasteners, and more particularly to fasteners for tacking (e.g. temporarily holding) two or more parts together.

2. Background Information

In many environments, it is necessary to temporarily hold and clamp parts together while other operations, such as drilling and riveting, are performed. For example, tack fasteners are widely used in the aircraft industry to temporarily attach the sheets of metal used to form the skin of an aircraft to the flanges of supporting structural elements, such as stringers and frames. Since it is time consuming and sometimes difficult (and therefore expensive) to temporarily fasten parts together using conventional mechanical devices, such as nuts and bolts, tack fasteners have been developed to avoid these problems. While various tack fasteners have been developed, those that require access to only one side of the parts to be fastened together are preferred, at least in the aircraft industry.

In addition to being undesirably complex, one disadvantage of the prior art tack fasteners, particularly those used in the aircraft industry, resides mainly in the inability to provide the high compression forces that are occasionally needed to pull parts together. In the past, this disadvantage has been overcome by utilizing nuts and bolts in regions where abnormally high compression forces are required and/or using a large number of closely spaced tack fasteners. Obviously, both approaches have disadvantages. The installation of nuts and bolts is time consuming and frequently requires the services of two employees, rather than a single employee. The use of large numbers of tack fasteners requires the creation of additional tack fastener holes, which is undesirable.

In general, the primary disadvantage of current tack fasteners is their inability to supply high compression forces while at the same time providing hole concentricity alignment, along with quick set-up and removal. While some tack fasteners provide one or two of these features, none provide all four.

The most commonly used temporary one-sided fasteners don't provide the required concentricity alignment for high tolerance holes, as well as the high clamp-up forces that are commonly required. These one-sided fasteners have parallel tangs that project and expand outwardly in only one axis, which can allow slippage 90° from that axis. In addition, the installation of these fasteners often requires two hands to prevent the rotation of the tangs with respect to the hole, until the fastener parts are drawn together with enough force to hold the tangs. Additionally, some fasteners will stick in the hole during removal, and may also damage the surrounding structure of the hole as a result of the high clamp-up forces.

SUMMARY OF THE INVENTION

The invention provides a one-sided, high clamp-up force, controlled concentricity, temporary fastener.

More specifically, the invention provides a tack fastener for temporarily holding two or more parts together, including an elongate tubular body having a longitudinal center cavity formed therein along a longitudinal center axis, a threaded hub at a first end of the body and a plurality of tangs at a second end. Each of the tangs includes an enlarged tip having an inner shoulder that lies orthogonal to the longitudinal center axis. Each tang has an outer surface which tapers inwardly toward the longitudinal axis in a direction toward the tip. A compression nut is mounted on the threaded hub. A stem is slidably mounted in the longitudinal center cavity. The stem includes a cone-shaped spreader with a distal end and having a contact surface with a gradually enlarging diameter in a direction toward the distal end. The spreader is movable between a position out of alignment with and a position in alignment with the enlarged tips. When in the position in alignment with the enlarged tips, the spreader spreads the tips outwardly equidistant from the longitudinal center axis.

Preferably, six tangs are provided for improved concentricity control. Also, the distal end of the spreader preferably includes an enlarged rim which engages the enlarged tips for supporting the enlarged tips when the spreader is in alignment with the enlarged tips to further support the tips to enable high clamp-up forces. Additionally, the stem and tubular body preferably have concentric mating hexagonal surfaces to prevent relative rotation therebetween. A swivel is also provided which is freely rotatable with respect to the compression nut for engagement against the parts to prevent damage of the parts.

Accordingly, the invention provides concentricity control, high clamp-up forces, minimal hole damage, a non-spinning mandrel, a free rotating load swivel, quick change grip length flexibility, as well as design flexibility.

While embodiments of this invention are illustrated and disclosed, these embodiments should not be construed to limit the claims. It is anticipated that various modifications and alternative designs may be made without departing from the scope of this invention.

BRIEF DESCRIPTION OF THE DRAWINGS

FIG. 3 shows a longitudinal cross-sectional view of the tack fastener and parts of FIG. 2;

FIG. 4 shows a horizontal cross-sectional view of a tubular body and stem in accordance with the invention;

FIG. 5 shows a longitudinal cross-sectional view of the tack fastener and parts of FIG. 3;

FIG. 6 shows a partial side view of an end of a stem in accordance with the invention;

FIG. 7 shows an end view of the stem of FIG. 6;

FIG. 8 shows a side view of a tack fastener in accordance with an alternative embodiment of the invention;

FIG. 9 shows a longitudinal cross-sectional view of the tack fastener of FIG. 8 taken at line 9—9; and FIG. 10 shows a horizontal cross-sectional view taken at line 10—10 of FIG. 9.

DETAILED DESCRIPTION OF THE INVENTION

Figure 1:
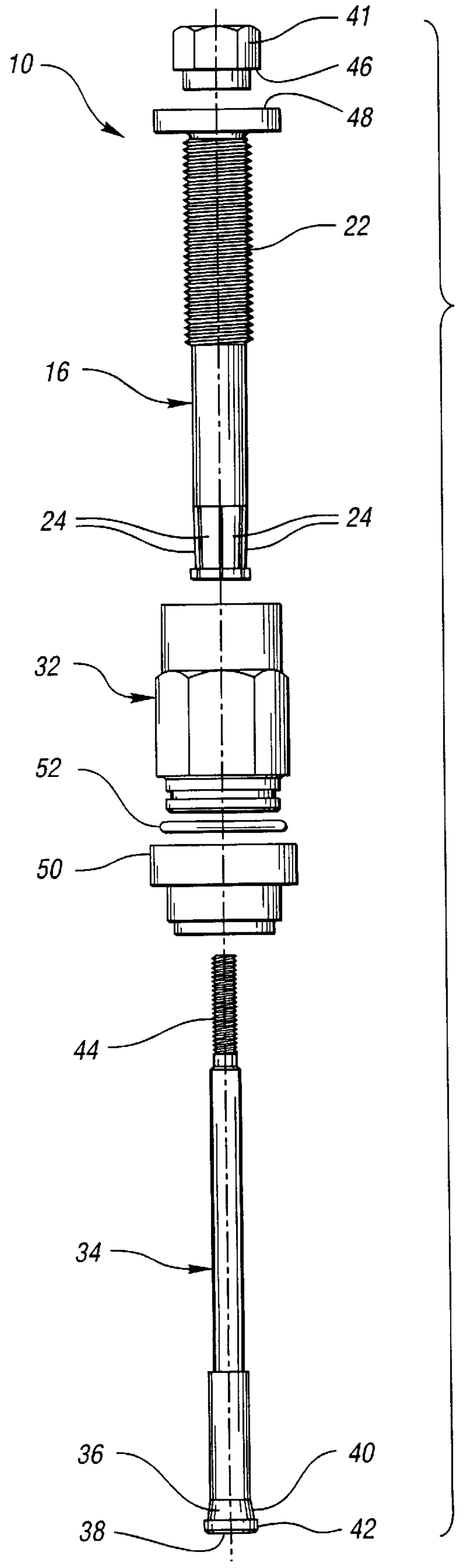
FIG. 1 shows an exploded side view of a tack fastener in accordance with the present invention.
Figure 2:
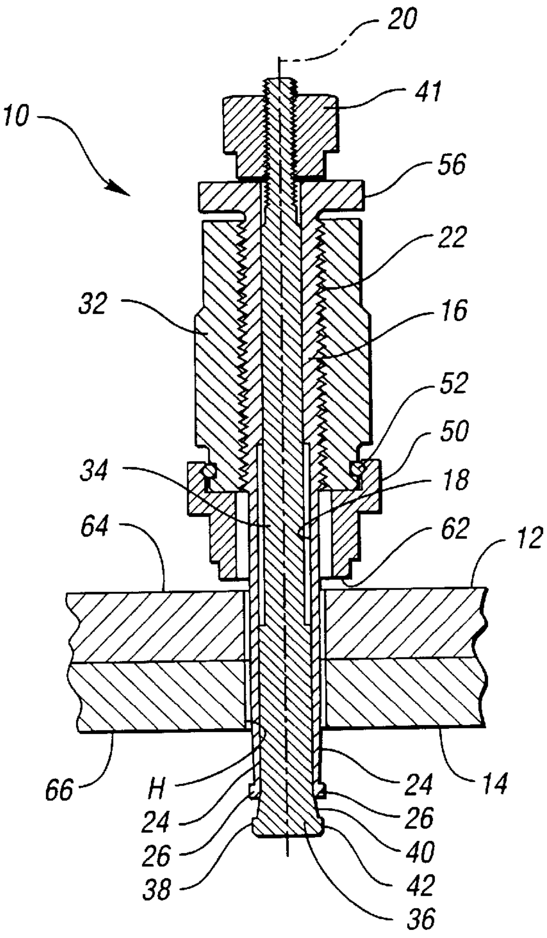
FIG. 2 shows a longitudinal cross-sectional view of the tack fastener of FIG. 1 inserted into a hole in a pair of parts to be tacked together.

Referring to FIGS. 1 and 2, an exploded side view and assembled longitudinal cross-sectional view are shown, respectively, of a tack fastener 10 in accordance with the invention. The tack fastener 10 is configured for temporarily holding two or more parts 12,14 together while various operations are performed on the parts 12,14, such as drilling, reaming, countersinking, cold working, or fastening.

The tack fastener 10 includes an elongate tubular body 16 having a longitudinal center cavity 18 formed therein along a longitudinal center axis 20. The elongate tubular body 16 includes a threaded hub 22 at a first end of the body 16 and a plurality of tangs 24 at a second end of the body 16.

The tangs 24 are more clearly shown in FIGS. 6 and 7. Each tang 24 includes an enlarged tip 26 having an inner shoulder 28 which lies orthogonal to the longitudinal center axis 20. Each of the tangs 24 has an outer surface 30 which tapers inwardly toward the longitudinal axis 20 in a direction toward the tips 26.

As shown in FIG. 7, preferably six tangs 24 are provided, and each tang 24 spans an angle θ of approximately 45°, and a gap G of approximately 0.015 inches is provided between adjacent tangs 24.

Returning to FIGS. 1 and 2, a compression nut 32 is internally threaded, and mounted on the threaded hub 22 of the elongate tubular body 16. A stem 34 is slidably mounted in the longitudinal center cavity 18 of the tubular body 16. The stem 34 includes a cone-shaped spreader 36 with a distal end 38, and having a cone-shaped contact surface 40 with a gradually enlarging diameter in a direction toward the distal end 38. The contact surface 40 is engageable with the enlarged tips 26 of the tangs 24 for spreading the tangs 24 in a manner equidistant from the longitudinal center axis 20.

The distal end 38 of the spreader 36 has an enlarged rim 42 which is engageable with the enlarged tips 26 of the tangs 24 for providing additional support to the tips 26 when the tangs 24 are fully spread apart, thereby allowing high compression forces, as described below.

Still referring to FIGS. 1 and 2, the tack fastener 10 also includes a pilot nut 41 threadedly engaged with the threads 44 of the stem 34. The pilot nut 41 includes a shoulder 46 which engages the top surface 48 of the elongate tubular body 16 to enable longitudinal movement of the stem 34 with respect to the tubular body 16 by rotation of the pilot nut 41.

The tack fastener 10 also includes a swivel 50 mounted to the compression nut 32 by a swivel retention ring 52. In this manner, the swivel 50 is freely rotatable with respect to the compression nut 32 to prevent damage to the parts being tacked, as described below.

Returning to FIG. 6, the tubular body 16 further includes a shaft portion 54 having a shaft diameter $D_s$. The enlarged tips 26 cooperate to form a tip diameter to $D_t$ which is less than or equal to the shaft diameter when the tangs are not spread apart by the spreader.

The operation of the tack fastener 10 will be described below with reference to FIGS. 2–7.

As shown in FIG. 2, the bottom end of the tubular body 16 and stem 34 may be inserted through the hole H formed in the parts 12,14 when the spreader 36 is out of alignment with the tangs 24. In this position, the tips 26 of the tangs 24 are collapsed inward toward the longitudinal center axis 20 which provides clearance to allow the enlarged tips 26 of the tangs 24 and the enlarged rim 42 of the spreader 36 to pass through the hole H for insertion.

In order to expand the enlarged tips 26 to grasp the bottom surface of the part 14, the pilot nut 41 is rotated to draw the stem 36 upward, as viewed in FIG. 2, with respect to the tubular body 16. In this manner, the spreader 36 may be drawn upward from the position shown in FIG. 2 to the position shown in FIG. 3 wherein the spreader 36 is aligned with the tangs 24 for spreading the tangs. As the spreader 36 moves upwardly, the tips 26 of the tangs 24 slide along the contact surface 40 of the spreader 36 to spread the tangs 24 equidistantly from the longitudinal center axis 20. The tubular body 16 must be held in place at the head 56 while rotating the pilot nut 41 to prevent rotation of the tubular body 16 and stem 34 as shown in the partial cross-sectional view of FIG. 4, which shows the stem 34 disposed within the threaded hub portion 22 of the tubular body 16.

The threaded hub 22 has a hexagonal internal surface portion 58 and the stem 34 has a hexagonal external surface portion 60 mating with the hexagonal internal surface portion 58 to prevent relative rotation between the two components. In this configuration, rotation of the pilot nut 41 does not cause rotation of the stem 34 with respect to the elongate tubular body 16. Rather, the stem 34 moves longitudinally within the tubular body 16 without rotation.

Turning to FIG. 5, rotation of the compression nut 32 draws the tubular body 16 and stem 34 upward via the threaded hub 22 mating with the threads of the compression nut 32. Accordingly, the engagement surface 62 of the swivel 50 engages the top surface 64 of the part 12, and the shoulder 28 (more clearly shown in FIG. 6) of the tangs 24 engages the bottom surface 66 of the part 14 adjacent the hole H for securing the parts 12,14 together. The swivel 50 is allowed to freely rotate with respect to the compression nut 32, thereby preventing ribbing motion of the engagement surface 62 of the swivel 50 against the part 12 to prevent damage of the part surface. In the position shown in FIG. 5, the enlarged rim 42 of the spreader 36 abuts against the bottom of the enlarged tips 26 of the tangs 24 to provide additional support for the tangs 24 to enable support of high compressive loads.

The tool 10 may be adjusted to clamp variously sized parts by simply adjusting the compression nut 32. Additionally, the tool may be redesigned to provide a longer or shorter threaded hub portion 22 for tacking thicker or thinner parts together.

In order to remove the tool 10 from the hole H in the parts 12,14, the pilot nut 41 is simply rotated in the opposite direction with respect to the head 56 of the tubular body 16 to move the spreader 36 back to the position shown in FIG. 2 in which it is out of alignment with the tangs 24 so that the tangs 24 collapse inwardly toward the longitudinal center axis 20 to provide clearance to allow the enlarged tips 26 to pass through the hole H in the parts 12,14 for removal.

An alternative embodiment of the invention is shown in FIGS. 8–10. This embodiment is in most respects similar to the embodiment shown in FIGS. 1–7, except the threaded pilot nut 41 is replaced by the cam handle 90 and spring 92 for raising and lowering the stem 94 with respect to the elongate tubular body 96. With the handle 90 in the "up" position shown in phantom in FIG. 8. the pilot spring 32 forces the stem 96 down so that the spreader 98 is out of alignment with the tangs 100 so that the tangs 100 collapse inward to allow insertion through a hole in the parts to be clamped together. When the handle 90 is moved to the "down" position shown in FIG. 8, the spring 92 is compressed, and the stem 94 is drawn upward so that the spreader 98 spreads the tangs 100 such that the shoulder 104 of each tang 100 engages the part 104, which is forced downward by the compression nut 106. As shown, the handle 90 rotates on the handle pin 108, and the cam surface 110 of the cam handle 90 engages the top surface 112 of the cam lock body 114, and pushes down on the top surface 112 such that the pin 108 moves upward relative to the cam lock body 114 and tubular body 96 to compress the pilot spring 92 and to draw the stem 94 upward relative to the tubular body 96 to cause the spreader 98 to spread the tangs 100. The head portion 116 is provided with slots (not shown) to allow vertical movement of the pin 108 in the slots.

As shown in FIG. 10, unthreaded flats 118 are provided on the inner periphery of the quick release clamping pressure nut 106 and the outer periphery of the cam lock body 114. In this manner, in order to freely slide the quick release clamping pressure nut 106 relative to the cam lock body 114, a ⅓ turn of the pressure nut 106 will disengage the threads so that the mating flats 118 are aligned to allow such longitudinal sliding for adjusting. In order to create high clamping forces, the pressure nut 106 is then rotated to engage the threads between the flats for tacking.

While the preferred embodiment of the invention has been illustrated and described, it is not intended that this embodiment illustrate and de scribe all possible forms of the invention. Rather, it is intended that the following claims cover all modifications and alternative designs, and all equivalents, that fall within the spirit and scope of this invention.

What is claimed is:

1. A tack fastener for temporarily holding two or more parts together comprising:

an elongate tubular body having a longitudinal center cavity formed therein along a longitudinal center axis, with a threaded hub at a first end of the body and a plurality of tangs at a second end, each of said tangs including an enlarged tip having an inner shoulder that lies orthogonal to the longitudinal center axis, and each of said tangs having an outer surface which tapers inwardly toward the longitudinal axis in a direction toward the tip;

a compression nut mounted on said threaded hub; and a stem slidably mounted in said longitudinal center cavity, said stem including a cone-shaped spreader with a distal end and having a contact surface with a gradually enlarging diameter in a direction toward said distal end, and said spreader being movable between a position out of alignment with and a position in alignment with said enlarged tips, and when in said position in alignment with the enlarged tips, said spreader spreading the tips outwardly equidistant from the longitudinal center axis.

2. The tack fastener of claim 1, wherein said plurality of tangs comprises six tangs.

3. The tack fastener of claim 1, wherein said distal end of the spreader comprises an enlarged rim engageable with said enlarged tips when the spreader is in said position in alignment with the enlarged tips for supporting the enlarged tips.

4. The tack fastener of claim 1, further comprising a pilot nut threadedly engaged with the stem for moving the stem longitudinally with respect to the tubular body.

5. The tack fastener of claim 1, further comprising a cam handle operatively engaged between the stem and tubular body for moving the stem longitudinally with respect to the tubular body.

6. The tack fastener of claim 1, further comprising a swivel moutned to the compression nut and freely rotatable with respect to the compression nut for holding the parts between the swivel and the inner shoulders of the tangs.

7. The tack fastener of claim 1, wherein said tubular body further comprises a shaft portion having a shaft diameter, and said enlarged tips cooperate to form a tip diameter less than or equal to said shaft diameter when the spreader is in said position out of alignment with the enlarged tips.

8. The tack fastener of claim 1, wherein said tubular body comprises a hexagonal internal surface portion and said stem comprises a hexagonal external surface portion engaged with said hexagonal internal surface portion to prevent relative rotation therebetween.

9. A tack fastener for temporarily holding two or more parts together comprising:

an elongate tubular body having a longitudinal center cavity formed therein along a longitudinal center axis, with a threaded hub at a first end of the body and at least four tangs at a second end, each of said tangs including an enlarged tip having an inner shoulder that lies orthogonal to the longitudinal center axis, and each of said tangs having an outer surface which tapers inwardly toward the longitudinal axis in a direction toward the tip;

a compression nut mounted on said threaded hub; and a stem slidably mounted in said longitudinal center cavity, said stem including a cone-shaped spreader with a distal end and having a contact surface with a gradually enlarging diameter in a direction toward said distal end, and said spreader being movable between a position out of alignment with and a position in alignment with said enlarged tips, and when in said position in alignment with the enlarged tips, said spreader spreading the tips outwardly equidistant from the longitudinal center axis.

10. The tack fastener of claim 9, wherein said at least four tangs comprises six tangs.

11. The tack fastener of claim 9, wherein said distal end of the spreader comprises an enlarged rim engageable with said enlarged tips when the spreader is in said position in alignment with the enlarged tips for supporting the enlarged tips.

12. The tack fastener of claim 9, further comprising a pilot nut threadedly engaged with the stem for moving the stem longitudinally with respect to the tubular body.

13. The tack fastener of claim 9, further comprising a cam handle operatively engaged between the stem and tubular body for moving the stem longitudinally with respect to the tubular body.

14. The tack fastener of claim 9, further comprising a swivel moutned to the compression nut and freely rotatable with respect to the compression nut for holding the parts between the swivel and the inner shoulders of the tangs.

15. The tack fastener of claim 9, wherein said tubular body further comprises a shaft portion having a shaft diameter, and said enlarged tips cooperate to form a tip diameter less than or equal to said shaft diameter when the spreader is in said position out of alignment with the enlarged tips.

16. The tack fastener of claim 9, wherein said tubular body comprises a hexagonal internal surface portion and said stem comprises a hexagonal external surface portion engaged with said hexagonal internal surface portion to prevent relative rotation therebetween.

17. A tack fastener for temporarily holding two or more parts together comprising:

an elongate tubular body having a longitudinal center cavity formed therein along a longitudinal center axis, a threaded hub at a first end of the body and a plurality of tangs at a second end, each of said tangs including an enlarged tip having an inner shoulder that lies orthogonal to the longitudinal center axis, and each of said tangs having an outer surface which tapers inwardly toward the longitudinal axis in a direction toward the tip;

a compression nut mounted on said threaded hub; and a stem slidably mounted in said longitudinal center cavity, said stem including a cone-shaped spreader having a distal end, said spreader being movable between a position out of alignment with and a position in alignment with said enlarged tips, and when in said position in alignment with the enlarged tips, said spreader spreading the tips outwardly equidistant from the longitudinal center axis, wherein said distal end comprises an enlarged rim engageable with said enlarged tips when the spreader is in said position in alignment with the enlarged tips for supporting the enlarged tips to enable high clamping forces.

18. The tack fastener of claim 17, wherein said plurality of tangs comprises six tangs.

19. The tack fastener of claim 17, wherein said cone-shaped spreader includes a contact surface with a gradually enlarging diameter in a direction toward said distal end.

20. The tack fastener of claim 17, wherein said tubular body comprises a hexagonal internal diameter portion and said stem comprises a hexagonal outer diameter portion engaged with said hexagonal internal diameter portion to prevent relative rotation therebetween.

* * * * *